United States Patent [19]

Dietz

[11] 4,238,354

[45] Dec. 9, 1980

[54] POLYMERIZATION OF OLEFINS

[75] Inventor: Richard E. Dietz, Bartlesville, Okla.

[73] Assignee: Phillips Petroleum Company, Bartlesville, Okla.

[21] Appl. No.: 3,566

[22] Filed: Jan. 15, 1979

[51] Int. Cl.$^3$ .................................................. C08F 4/64
[52] U.S. Cl. ........................... 252/429 B; 252/429 C; 526/125
[58] Field of Search ........... 252/429 C, 429 B, 431 R, 252/428, 430

[56] References Cited

U.S. PATENT DOCUMENTS

| | | | |
|---|---|---|---|
| 3,121,063 | 2/1964 | Tornquist | 252/429 C |
| 3,644,318 | 2/1972 | Diedrich et al. | 252/429 C X |
| 3,718,636 | 2/1973 | Stevens et al. | 252/429 C X |
| 3,784,481 | 1/1974 | Lassau et al. | 252/429 C X |
| 3,801,558 | 4/1974 | Fletcher et al. | 252/429 C X |
| 3,821,186 | 6/1974 | Grant | 252/429 C X |
| 3,901,863 | 8/1975 | Berger et al. | 252/429 C X |
| 3,903,017 | 9/1975 | Ziegler et al. | 252/429 A |
| 4,105,585 | 8/1978 | Matheson | 252/429 C X |

*Primary Examiner*—Patrick Garvin

[57] ABSTRACT

A process for polymerizing alpha-olefins in the presence of a catalyst comprising two components. Component A is obtained by mixing a milled mixture of magnesium and particulate inorganic solid with an alcohol and then contacting the resultant product with a tetravalent halogenated titanium compound. Component B comprises a metallic hydride or an organometallic compound, e.g., an organoaluminum compound.

10 Claims, No Drawings

POLYMERIZATION OF OLEFINS

BACKGROUND OF THE INVENTION

This invention relates to a process for polymerizing olefins. In another aspect, this invention relates to a process for making a polymerization catalyst. In another aspect, this invention relates to a process for polymerizing alpha-olefins using a catalyst system wherein said catalyst is prepared by a novel process. In another aspect, this invention relates to a novel process for forming a catalyst which can be used with a co-catalyst to form a catalyst system for the polymerization of alpha-olefins. In another aspect, this invention relates to a catalyst prepared by mixing a milled mixture of magnesium and an inorganic solid with an alcohol and then contacting said product mixture with a titanium compound. In another aspect, this invention relates to a catalyst system for polymerizing alpha-olefins wherein a first component, obtained by mixing a milled mixture of magnesium and an inorganic solid with an alcohol and then contacting the resultant product with a titanium compound, is combined with a second component comprising an organometallic compound, e.g., an organoaluminum compound.

It is known to polymerize alpha-olefins and mixtures thereof according to the low pressure process of Ziegler. In this process, the catalysts used are prepared from mixtures of compounds of elements of Subgroups IV and VI of the Periodic Table and the organometallic compounds of the elements of Groups I to III of the Periodic Table. The polymerization is generally carried out in suspension, in solution or even in a gaseous phase.

The activity of an olefin polymerization catalyst is one important factor in the continuous search for a catalyst useful for the polymerization of alpha-olefins. It is also desirable that the process used in forming the catalyst be such as to allow ease in preparation and to allow control over the final catalyst formed.

It is an object of this invention, therefore, to provide an improved process for the polymerization of alpha-olefins.

Another object of this invention is to provide a novel and improved method for preparing a catalyst composition.

Another object of this invention is to provide a process for preparing a tetravalent titanium compound and magnesium alkoxide containing catalyst composition wherein the magnesium alkoxide is intimately dispersed in the support.

Another object of this invention is to provide a process for preparing a catalyst composition comprising a magnesium alkoxide wherein the magnesium alkoxide is formed in situ by mixing magnesium with an alcohol to form the alkoxide and agglomeration of the resultant sticky magnesium alkoxide is avoided.

Another object of this invention is to provide a process for preparing a catalyst composition comprising a tetravalent titanium compound and a magnesium alkoxide wherein the magnesium alkoxide is formed by mixing magnesium and alcohol and rapid and complete reaction of the magnesium and alcohol is insured and the precise amount of alcohol can be metered into the reaction mixture.

Other objects, aspects and the several advantages of this invention will be apparent to those skilled in the art upon a study of this disclosure and the appended claims.

SUMMARY OF THE INVENTION

The present invention provides a process for preparing a catalyst for the polymerization of alpha-olefins. Said catalyst comprises two components, A and B. Catalyst component A comprises a tetravalent, halogenated titanium compound and a magnesium alkoxide on an inorganic support. The catalyst component is obtained by mixing a milled mixture of magnesium and a particulate inorganic solid with an alcohol and contacting the resultant mixture product with a tetravalent, halogenated titanium compound. Component B comprises a metallic hydride or an organometallic compound wherein said metal is selected from Groups IA, IIA and IIIA of the Periodic Table.

In a specific embodiment of this invention, magnesium is ball milled with an inorganic solid, preferably magnesium chloride. The ball milled mixture can then be slurried in a dry, inert hydrocarbon and mixed with an alcohol such as methanol. The resultant product is then treated with a tetravalent, halogenated titanium compound such as titanium tetrachloride with unreacted titanium tetrachloride being removed from the resulting catalyst by washing. The catalyst is then combined with a hydride or an organometallic compound, e.g., an organoaluminum compound, as a co-catalyst to form an active catalyst suitable for the polymerization of a mono-1-olefin (alpha-olefin) such as ethylene.

DETAILED DESCRIPTION OF THE INVENTION

Active alpha-olefin polymerization catalysts are prepared in a two-step process by first mixing a milled mixture of magnesium and particulate inorganic solid with an alcohol. The milled mixture can be slurried in a dry, inert hydrocarbon prior to the mixing with the alcohol. That product is contacted with a tetravalent, halogenated titanium compound which is then washed with dry hydrocarbon to remove any unreacted titanium compound and dried to obtain the catalyst of this invention. The catalyst can be used with an organometallic co-catalyst such as an organoaluminum compound to form a catalyst system that is used to polymerize alpha-olefins such as ethylene or mixtures of olefins such as ethylene admixed with a higher 1-olefin. Normally solid polymers are recovered from the polymerization zone and they can be converted into film, molded articles, and the like by means of extrusion, below molding, etc.

The alcohols generally used to react with the magnesium to form magnesium alkoxides intimately admixed with the particulate solid are monohydric alcohols. The preferred alcohols can be expressed as ROH in which R is a straight chain or branched chain alkyl group containing from 1 to about 20 carbon atoms. Exemplary compounds include methanol, ethanol, n-butanol, 2-ethylhexanol-1, 2,3-dimethylbutanol-2, 2-methyl-3-ethylpentanol-3, dodecanol-1, eicosanol-1, and the like. Methanol is a convenient alcohol to use because of its ready availability in purified form.

The magnesium is preferably in the form of fine particles which can be obtained by milling the mixture of magnesium and a particulate inorganic solid such as alumina, silica, calcium carbonate, magnesium oxide, sodium chloride, and the like. Ball milling is a convenient and the preferred method of milling such a mixture. Preferably, the particulate inorganic solid used is a halide of magnesium or manganese since the inclusion such compounds appears to improve the activity of the catalysts. Exemplary compounds are the chlorides of these elements with magnesium chloride the most preferred compound. A mole ratio of Mg to inorganic solid ranging from about 0.1:1 to about 10:1 can be used. The milling times and conditions can vary greatly with milling times ranging from about 5-50 hours at ambient temperatures and pressures generally employed.

The mixture of Mg-inorganic solid can be slurried in a dry hydrocarbon, e.g., a paraffin, cycloparaffin or aromatic hydrocarbon containing from about 4-12 carbon atoms per molecule, which is inert in the process. Exemplary hydrocarbons include n-butane, n-pentane, n-hexane, methylcyclohexane, benzene, toluene, and the like. Generally, any well known inert hydrocarbon diluent can be used.

The magnesium particles appear to become more reactive by the ball milling process and they react rapidly and completely when the alcohol is added. Several advantages result from reacting the alcohol with a milled magnesium-particulate solid mixture contained in the hydrocarbon diluent. One, the precise amount of alcohol can be metered into the reaction mixture to obtain the $Mg(OR)_2 \cdot ROH$ stoichiometry desired in the final product. This is important since excessive alcohol can depress catalytic activity. Two, the reaction rate can be adjusted to avoid agglomeration of an otherwise sticky $Mg(OR)_2$ which normally results when magnesium and an alcohol reacts. Three, since the magnesium is intimately dispersed in the particulate solid, the reaction with the alcohol yields an intimate dispersion of the magnesium alkoxide product in the particulate solid.

During the addition of the alcohol, the reaction mixture is stirred or agitated to improve contact of the reactants. Although the reaction can take place at room temperature, if desired, better results generally happen (in terms of preventing agglomeration) by metering the alcohol into a refluxing reaction mixture.

Metering of the alcohol into reaction mixture is performed slowly to allow formation of the magnesium alkoxide admixed with particulate solid in either particulate form or in a form, e.g., plates, that is readily broken up into fine particles and which can be slurried easily in the reaction mixture. For example, a 10 g mixture of Mg and $MgCl_2$ containing 20 wt% magnesium can be reacted in a hydrocarbon diluent, e.g., 200 ml n-hexane, at refluxing temperature with 10 ml (1.5 times stoichiometric) of methanol metered in over a 1 hour period to obtain a product showing no evidence of agglomeration.

The amount of alcohol associated with the magnesium hydrocarbyloxide can range from 0 to about 3 moles per mole of the magnesium compound.

The product obtained by mixing the alcohol with the magnesium-particulate solid mixture is contacted with a tetravalent, halogenated titanium compound. Any suitable tetravalent, halogenated titanium compound can be used as long as the titanium compound has one halogen attached thereto. Suitable compounds can be represented by the formula $TiX_a(OR')_{4-a}$ in which X stands for bromine, chlorine or iodine or mixtures thereof, a is an integer of 1 to 4 and R' is an alkyl, cycloalkyl or aryl group and combinations thereof, such as alkaryl, containing from 1 to about 20 carbon atoms. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, and the like. A presently preferred compound is titanium tetrachloride because of availability and relatively low cost.

The contacting can be carried out generally at temperatures in the range of about 0° C. to about 150° C. with the decomposition temperature of the tetravalent, halogenated titanium compound determining the limits. The length of the contacting period can vary greatly with the period of time generally ranging from about 0.05 to about 20 hours.

The mole ratios of magnesium (based on initial metallic magnesium) to titanium compound can range from about 0.05:1 to 1:1. Excess titanium compound is removed by contacting the reaction product with a hydrocarbon inert in the process, e.g., a paraffin, cycloparaffin or aromatic hydrocarbon.

The formed catalyst, component A, is then combined with a co-catalyst, component B to form a catalyst system useful for the polymerization of olefins. Component B is a hydride or an organometallic compound wherein said metal is selected from an element of Groups IA, IIA and IIIA of the Periodic Table. In other words, component B can be a hydride of the metals of Groups IA, IIA and IIIA or an organo-compound of the metals. The preferred compound to be used as component B is an organoaluminum compound which can be represented by the formula $AIR''_bY_{3-b}$ in which R'' is the same or different hydrocarbon radical selected from such groups as alkyl, cycloalkyl, aryl, alkaryl and the like having from 1 to about 12 carbon atoms per molecule, Y is a monovalent radical selected from among the halogens and hydrogen, and b is an integer of 0 to 3. Specific examples of organoaluminum compounds include trimethylaluminum, triethylaluminum, tridodecylaluminum, tricyclohexylaluminum, triphenylaluminum, tribenzylaluminum, diethylaluminum chloride, diisobutylaluminum hydride, ethylaluminum dibromide, and the like.

Any alpha-olefin, or mixture thereof, can be polymerized in the presence of the catalyst of the present invention with the preferred reactant being ethylene or ethylene plus another higher aliphatic mono-1-olefin containing from 3-10 carbon atoms. The alpha-olefin is polymerized by contact with the catalyst system of this invention in solution, in suspension or in gaseous phase at temperatures ranging from about 20°-200° C. and pressures ranging from about atmospheric to about 1000 psig (6.9 MPa). The homopolymerization and copolymerization reactions can be conducted batchwise or in continuous fashion by employing any known process.

It is convenient when polymerizing ethylene in bench scale process, for example, to conduct the polymerization batchwise in a stirred reactor employing a dry hydrocarbon diluent inert in the process such as isobutane, n-heptane, methylcyclohexane, benzene, toluene and the like at a reactor temperature of about 80° C. and a reactor pressure of about 280 psig (1.9 MPa). Ethylene is admitted to the reactor as required to maintain the desired pressure. Molecular weight control agents such as hydrogen, can be employed in the reactor as known in the art to adjust the molecular weight of the polymer.

When the selected polymerization time is reached the reaction can be terminated by discontinuing the flow of ethylene and comonomer, if used, venting unreacted monomer(s) and diluent and recovering the polymer. The recovered product can be treated to deactivate or remove catalyst residues such as by an alcohol wash, can be stabilized by admixture with an antioxidant(s)

and can be dried to remove residual solvent, if present, as is known in the art. The final product can be further processed into pellets and/or converted into the final shaped product.

The following examples are set forth as illustrative of this invention and are not meant to be restrictive in any way.

EXAMPLE 1—CATALYST PREPARATION

The catalysts below were prepared by charging the reactants in a manner to be described to a 500 ml round bottom glass flask arranged for reflux, for nitrogen blanketing of the flask contents and for magnetic stirring.

Catalyst A: A flask was charged with 10 g of a Mg.MgCl$_2$ mixture consisting of a calculated 1:1 mole ratio of components. The mixture contained 2 g (0.0823 moles) of magnesium. The mixture was prepared by milling 20 g of commercially obtained magnesium powder and 80 g of dry magnesium chloride for 21 hours at ambient conditions in a 1 liter steel vessel containing 2300 g of $\frac{3}{8}''$ (0.95 cm) steel balls by employing a vibratory mill (Vibratom). About 200 ml of dry n-hexane was added to the flask and the mixture heated to refluxing temperature. To the refluxing mixture while it was stirred was added 10.0 ml (7.92 g, 0.247 moles) of methanol over a 1 hour period. This amount of methanol is 1.5 times the stoichiometric quantity needed to react with the magnesium. No evidence of agglomeration was noted. Refluxing and stirring of the reaction product was continued for 4 more hours. The mixture was cooled to room temperature (about 23° C.) and 50 ml (86.3 g, 0.45 moles) of TiCl$_4$ was added to it. Thus, the calculated mole ratio of magnesium (based on starting metallic magnesium) to TiCl$_4$ was 0.18:1. The mixture was then heated to reflux, refluxed for 4 hours, and cooled to room temperature. The supernatant liquid was decanted, the solid product washed with five 450 ml portions of dry n-hexane by employing a slurrying, settling and decant sequence, and the solid product recovered was dried at room temperature under reduced pressure.

Catalyst B: The same quantities of reactants were employed as in producing catalyst A, except that 13.3 ml (10.5 g, 0.328 moles) of methanol was added to the refluxing mixture over a 1 hour period. This amount of methanol is 2 times the stoichiometric quantity needed to react with the magnesium. No evidence of agglomeration was again noted. The mixture was refluxed for 4 additional hours, cooled to room temperature and 50 ml of TiCl$_4$ added as before. The mixture was heated to reflux temperature, refluxed 4 hours, cooled to room temperature, the supernatant liquid decanted and about 300 ml of dry n-hexane added. The slurrying, settling, decanting sequence was repeated a total of 6 times, employing about 300 ml of n-hexane in each wash. The product was recovered and dried as before.

Catalyst C: A mixture consisting of 50 g of the magnesium powder employed in preparing catalyst A and 30 g of a previous calcined silica-titania xerogel containing about 2.5 wt% titanium was ball milled employing the conditions described under catalyst A. The calculated Mg/silica mole ratio is 4.4:1.

A flask was charged with 4 g of the magnesium-silica mixture which contained 2.5 g Mg (0.104 moles) and about 100 ml of dry n-hexane. While stirring the mixture at room temperature, 12.6 ml (9.97 g, 0.311 moles) of methanol was added in one portion. This amount of methanol is 1.5 times the stoichiometric quantity needed to react with the magnesium. The contents of the flask became hot to the touch and a sticky material formed which adhered to the walls of the flask. The contents of the flask were diluted to 250 ml by adding dry n-hexane but forming a slurry of the reaction product was not possible. The flask and contents were allowed to stand overnight. The following day the material coating the container surfaces was broken loose with a spatula, the contents of the flask stirred about 5 hours to break up the large particles and the mixture was refluxed for 3.5 hours. While refluxing and stirring the mixture, 50 ml of TiCl$_4$ (0.45 moles) was rapidly added. The resulting mixture was refluxed an additional 3.5 hours during which HCl was evolved. The stirred mixture was cooled to room temperature and diluted to 500 ml with dry n-hexane. Stirring was discontinued, the mixture allowed to stand 3 days and the supernatant liquid decanted. The product was then washed by reslurrying it with about 450 ml n-hexane, allowing settling to occur and decanting supernatant liquid. A total of 5 such slurrying-decantings was employed. The product was recovered and dried under reduced pressure at ambient temperature. The calculated mole ratio of Mg:TiCl$_4$ is 0.37:1.

Catalyst D: This catalyst was prepared in the manner employed with catalyst C with the same quantities of reactants except that 16.8 ml (13.3 g, 0.415 moles) of methanol was added to the Mg/silica-n-hexane mixture. This amount of methanol is 2 times the stoichiometric quantity needed to react with the magnesium.

EXAMPLE 2

A dry, stirred, stainless steel reactor of 1 gallon (3.8 liter) capacity containing about 3 liters of dry n-heptane was heated to 175° C. for about 30 minutes. The reactor was drained, residual n-heptane purged with a stream of dry nitrogen and the closed reactor cooled to room temperature while under nitrogen. The cool reactor was purged with isobutane vapor, 2.7 mmoles of triethylaluminum (TEA), the co-catalyst, added as a 15 wt% solution in n-heptane, and a specified amount of catalyst was added. After charging 2 liters of isobutane, the reactor and contents were heated to 80° C. and 100 psig (0.69 MPa) ethylene pressure added to the reactor. Additional ethylene was charged as required during each 1 hour polymerization run to maintain the pressure. Each run was terminated by venting the ethylene and isobutane and the recovered polymer was dried and weighed to determine the yield.

The amount of catalyst charged in each run and the results obtained are given in Table 1.

TABLE 1

| | Ethylene Polymerization | | | |
|---|---|---|---|---|
| Run No. | Catalyst No. | Catalyst Charged, g | Polymer Yield, g | Productivity g/g catalyst/hour Actual | Normalized |
| 1 | A | 0.0235 | 252 | 10,700 | 24,900 |
| 2 | B | 0.0157 | 94 | 5,990 | 14,900 |
| 3 | C | 0.0432 | 121 | 2,800 | 3,780 |
| 4 | D | 0.0410 | 107 | 2,610 | 4,010 |

Actual productivity is calculated by dividing the weight of polymer produced by the weight of the catalyst as prepared. The normalized productivity is a calculated quantity based on the calculated amount of magnesium methoxide in each catalyst sample. For example, catalyst A, exclusive of TiCl₄, is calculated to contain 43 weight percent magnesium methoxide. Thus, 0.0235 g×0.43=0.0101 g, the wt of catalyst based on magnesium methoxide. The normalized productivity is calculated by dividing 252 g by 0.0101 g to obtain 24,900 g polymer/g catalyst.

Runs 1 and 2 employ a catalyst prepared from a mixture of magnesium and magnesium chloride. The effect of methanol associated with the magnesium methoxide formed during catalyst preparation is reflected in the productivity results. In run 1, the magnesium methoxide is calculated to have 0.5 mole methanol associated with it and the actual productivity of catalyst A is calculated as 10,700 g polyethylene per g catalyst per hour. In run 2, a mole of methanol is calculated to be associated with a mole of magnesium methoxide. Although catalyst B is still an active ethylene polymerization catalyst, the effect of 0.5 more mole methanol has resulted in decreasing catalyst productivity to a calculated 5990 g per g catalyst per hour.

Runs 3 and 4 employ catalysts prepared from a mixture of magnesium and a dry silica-titania cogel. Relatively active catalysts are made based on the productivity results but their activities range from about 0.2 to about 0.4 that of the magnesium chloride-containing catalysts of runs 1 and 2. Catalyst C in run 3 is calculated to contain 0.5 mole methanol associated with each mole magnesium methoxide present and the actual productivity of the catalyst is calculated as 2800 g polyethylene per g catalyst per hour. Catalyst D in run 4 is calculated to contain 1 mole methanol associated with each mole of magnesium methoxide. The actual productivity of the catalyst is calculated as about 2600 g polyethylene per g catalyst per hour. As in runs 1 and 2, increasing the methanol content results in lowering catalyst productivity to some extent.

The normalized productivity figures are included to show catalyst activity based on the calculated amount of magnesium methoxide present in each sample. On this basis, the presence of the inorganic particulate solid appears to increase catalytic activity of the magnesium compound.

The difference in productivity values obtained in runs 1 and 2 with the magnesium chloride-containing catalysts compared to the lower values obtained with the silica-containing catalysts of runs 3 and 4 suggests that magnesium halides contribute to the catalytic activity of the catalyst systems of this invention. Thus their presence is preferred in the best embodiment of this invention.

Reasonable variations and modifications which will become apparent to those skilled in the art can be made in the present invention without departing from the spirit and scope thereof.

I claim:

1. A method for preparing a catalyst composition comprising mixing a milled mixture of magnesium and particulate inorganic solid selected from the group consisting of magnesium halides with an alcohol to form an unagglomerated product, the alcohol being employed in a quantity as stoichiometrically required to convert the magnesium to magnesium hydrocarbyloxide having 0-3 moles of alcohol per mole associated therewith,
   contacting said product with a tetravalent, halogenated titanium compound, and
   washing said titanium contacted product with an inert solvent to remove any unreacted titanium compound.

2. A method in accordance with claim 1 wherein said magnesium and inorganic solid are ball milled to form the milled mixture and then slurried in a dry, inert hydrocarbon prior to the mixing with the alcohol.

3. A method in accordance with claim 2 wherein said alcohol is added to the milled mixture while the milled mixture is being refluxed.

4. A method in accordance with claim 1 wherein the contacting of the product with the titanium compound takes place at a temperature ranging from about 0° to 150° C. for a period of time ranging from about 0.05 to 20 hours.

5. A method in accordance with claim 1 wherein said inorganic solid is magnesium chloride and said tetravalent, halogenated titanium compound is titanium tetrachloride.

6. A method for the preparation of a catalyst which comprises
   forming a component A by mixing a milled mixture of magnesium and particulate inorganic solid selected from the group consisting of magnesium halides with an alcohol to form an unagglomerated product, the alcohol being employed in a quantity as stoichiometrically required to convert the magnesium to magnesium hydrocarbyloxide having 0-3 moles of alcohol per mole associated therewith, contacting said reaction product with a tetravalent, halogenated titanium compound and washing said titanium contacted product with an inert solvent to remove any unreacted titanium compound, and then
   combining component A with a component B which is a metallic hydride or organometallic compound wherein said metal is selected from an element of Groups IA, IIA and IIIA of the Periodic Table.

7. A method in accordance with claim 6 wherein said magnesium and inorganic solid are ball milled to form the milled mixture and then slurried in a dry, inert hydrocarbon prior to the reaction with the alcohol.

8. A method in accordance with claim 7 wherein said alcohol is added to the milled mixture while the milled mixture is being refluxed.

9. A method in accordance with claim 6 wherein said contacting of the reaction product with the titanium compound takes place at a temperature ranging from about 0° to 150° C. for a period of time ranging from about 0.05 to about 20 hours.

10. A method in accordance with claim 6 wherein said inorganic solid is magnesium chloride and said tetravalent, halogenated titanium compound is titanium tetrachloride.

* * * * *